United States Patent
Yoon et al.

(10) Patent No.: US 9,140,291 B2
(45) Date of Patent: Sep. 22, 2015

(54) APPARATUS FOR COVERING A FASTENER SYSTEM

(71) Applicants: Ilsop Steven Yoon, Renton, WA (US); Jeffrey D. Eichinger, Fountain Valley, CA (US); Kevin Darrell Pate, Kirkland, WA (US)

(72) Inventors: Ilsop Steven Yoon, Renton, WA (US); Jeffrey D. Eichinger, Fountain Valley, CA (US); Kevin Darrell Pate, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 217 days.

(21) Appl. No.: 13/630,741

(22) Filed: Sep. 28, 2012

(65) Prior Publication Data

US 2014/0091175 A1    Apr. 3, 2014

(51) Int. Cl.
*F16B 39/02* (2006.01)
*F16B 37/14* (2006.01)

(52) U.S. Cl.
CPC ........................................ *F16B 37/14* (2013.01)

(58) Field of Classification Search
USPC ............. 411/337, 377, 372.5, 372.6; 361/218
IPC .................................. F16B 37/14; B64D 45/02
See application file for complete search history.

(56) References Cited

U.S. PATENT DOCUMENTS

| | | | |
|---|---|---|---|
| 2,710,113 A | 6/1955 | Pritchard | |
| 4,905,931 A | 3/1990 | Covey | |
| 7,277,266 B1* | 10/2007 | Le et al. | 361/218 |
| 7,721,996 B2* | 5/2010 | Gehrett et al. | 244/132 |
| 7,740,434 B2* | 6/2010 | Kamino et al. | 411/372.5 |
| 7,835,130 B2* | 11/2010 | Ware et al. | 361/218 |
| 7,969,706 B2* | 6/2011 | Heeter et al. | 361/218 |
| 8,388,293 B2* | 3/2013 | Hutter, III | 411/377 |
| 2011/0315818 A1 | 12/2011 | Chao et al. | |
| 2012/0074257 A1 | 3/2012 | Bessho et al. | |
| 2012/0219380 A1 | 8/2012 | Hutter, III | |

FOREIGN PATENT DOCUMENTS

| | | |
|---|---|---|
| EP | 0334011 A1 | 9/1989 |
| EP | 2465777 A2 | 6/2012 |
| WO | WO2013178985 A1 | 12/2013 |

OTHER PUBLICATIONS

PCT Search Report dated Nov. 4, 2013, regarding Application No. PCT/US2013053601, 11 pages.

* cited by examiner

*Primary Examiner* — Gary Estremsky
(74) *Attorney, Agent, or Firm* — Yee & Associates, P.C.

(57) ABSTRACT

A method and apparatus for covering a fastener system. In one illustrative embodiment, an apparatus comprises a cover. The cover is configured to be placed over a fastener system at a surface of an object in which the fastener system is installed. The cover is comprised of a number of composite materials selected such that the cover is configured to reduce an effect of an electrical discharge, which occurs around the fastener system, on an environment outside the cover.

17 Claims, 4 Drawing Sheets

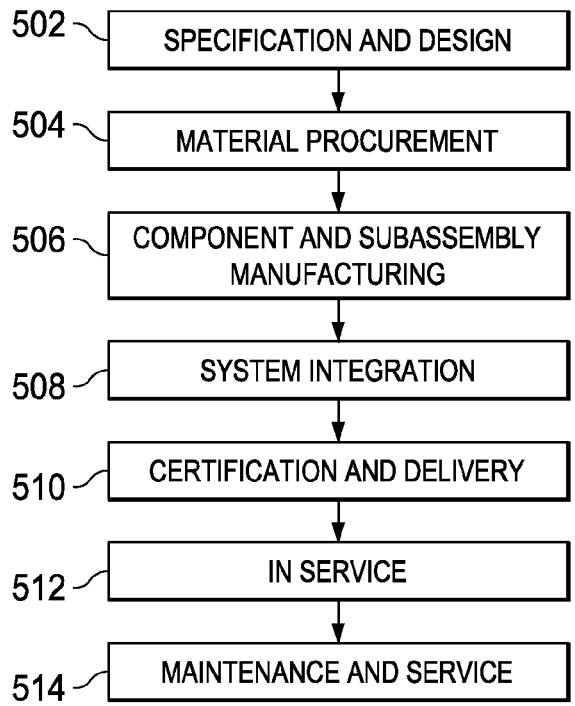
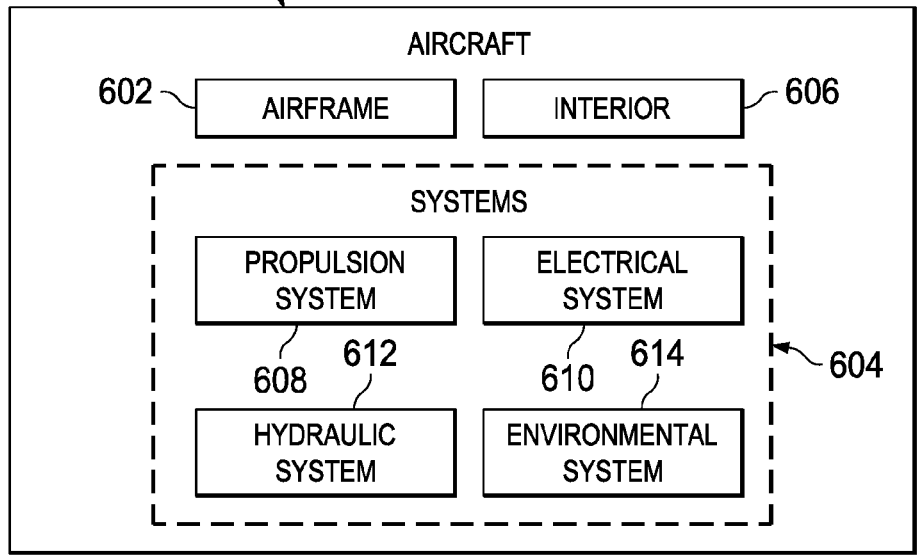

ary other. Still electrical properties within selected ranges.

APPARATUS FOR COVERING A FASTENER SYSTEM

BACKGROUND INFORMATION

1. Field

The present disclosure relates generally to covers and, in particular, to covers comprised of composite materials. Still more particularly, the present disclosure relates to a method and apparatus for covering the ends of fastener systems using covers comprised of composite materials selected such that the covers have electrical properties within selected ranges.

2. Background

Sealant materials are oftentimes used to cover and seal fastener systems. In some cases, a sealant material is pre-molded into a cap having a shape configured to be installed over the end of a fastener system to cover the fastener system and seal the fastener system. In particular, this "cap" is used to prevent substances such as, for example, without limitation, air, liquid, dirt, and/or other types of substances from crossing the barrier formed by the cap.

Sealant materials may be used to cover and seal fastener systems in different types of systems and structures. In some cases, at least one component in a fastener system is comprised of an electrically conductive material, such as, for example, metal. Consequently, the fastener system may be prone to voltages and currents induced by an electromagnetic event, such as lightning, a short circuit, or some other type of electromagnetic event. These induced voltages and currents may lead to electrical discharge in the form of electrical sparking and/or arcing.

This electrical discharge may present safety issues depending on the area within which the electrical discharge occurs. For example, when the electrical discharge occurs within a fuel tank, the electrical discharge may cause undesired effects within the fuel tank.

The sealant material used to cover the fastener system may be configured to help suppress the potential for electrical discharge. However, some currently available sealant materials are comprised of elastomeric materials. Elastomeric materials are also referred to as elastomers. These types of sealant materials may be referred to as elastomeric sealants. Elastomeric sealants may be sensitive to temperature. As the temperature of the elastomeric sealant changes, the performance of the elastomeric sealant with respect to suppressing the potential for electrical discharge may vary.

Further, pre-molding an elastomeric sealant into the shape of a cap may be more difficult and/or time-consuming than desired. The elastomeric sealant may also have strength limitations. Consequently, the elastomeric sealant may need to have a thickness that is greater than desired to achieve suppression of the potential for electrical discharge. Therefore, it would be desirable to have a method and apparatus that takes into account at least some of the issues discussed above, as well as other possible issues.

SUMMARY

In one illustrative embodiment, an apparatus comprises a cover. The cover is configured to be placed over a fastener system at a surface of an object in which the fastener system is installed. The cover is comprised of a number of composite materials selected such that the cover is configured to reduce an effect of an electrical discharge, which occurs around the fastener system, on an environment outside the cover.

In another illustrative embodiment, a method for covering a fastener system is provided. A cover is placed over a fastener system at a surface of an object in which the fastener system is installed. The cover is comprised of a number of composite materials. An effect of an electrical discharge, occurring around the fastener system, on an environment outside the cover is reduced using the cover.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of an aircraft manufacturing and service method in the form of a block diagram in accordance with an illustrative embodiment; and FIG. 6 is an illustration of an aircraft in the form of a block diagram in accordance with an illustrative embodiment.

DETAILED DESCRIPTION

The different illustrative embodiments recognize and take into account different considerations. For example, the illustrative embodiments recognize and take into account that it may be easier and less time-consuming to form a cap for a fastener system that is comprised of a composite material as compared to an elastomeric material.

Further, the illustrative embodiments recognize and take into account that a composite material may be designed and formed to have electrical properties with values within selected ranges. In particular, these ranges may be selected such that the composite material is capable of suppressing the potential for electrical discharge.

However, a cap formed from a composite material may be unable to provide the quality of seal that can be provided by an elastomeric sealant. Consequently, the illustrative embodiments recognize and take into account that it may be desirable to use both an elastomeric sealant and a cap formed from a composite material to cover the end of a fastener system.

Figure 1:
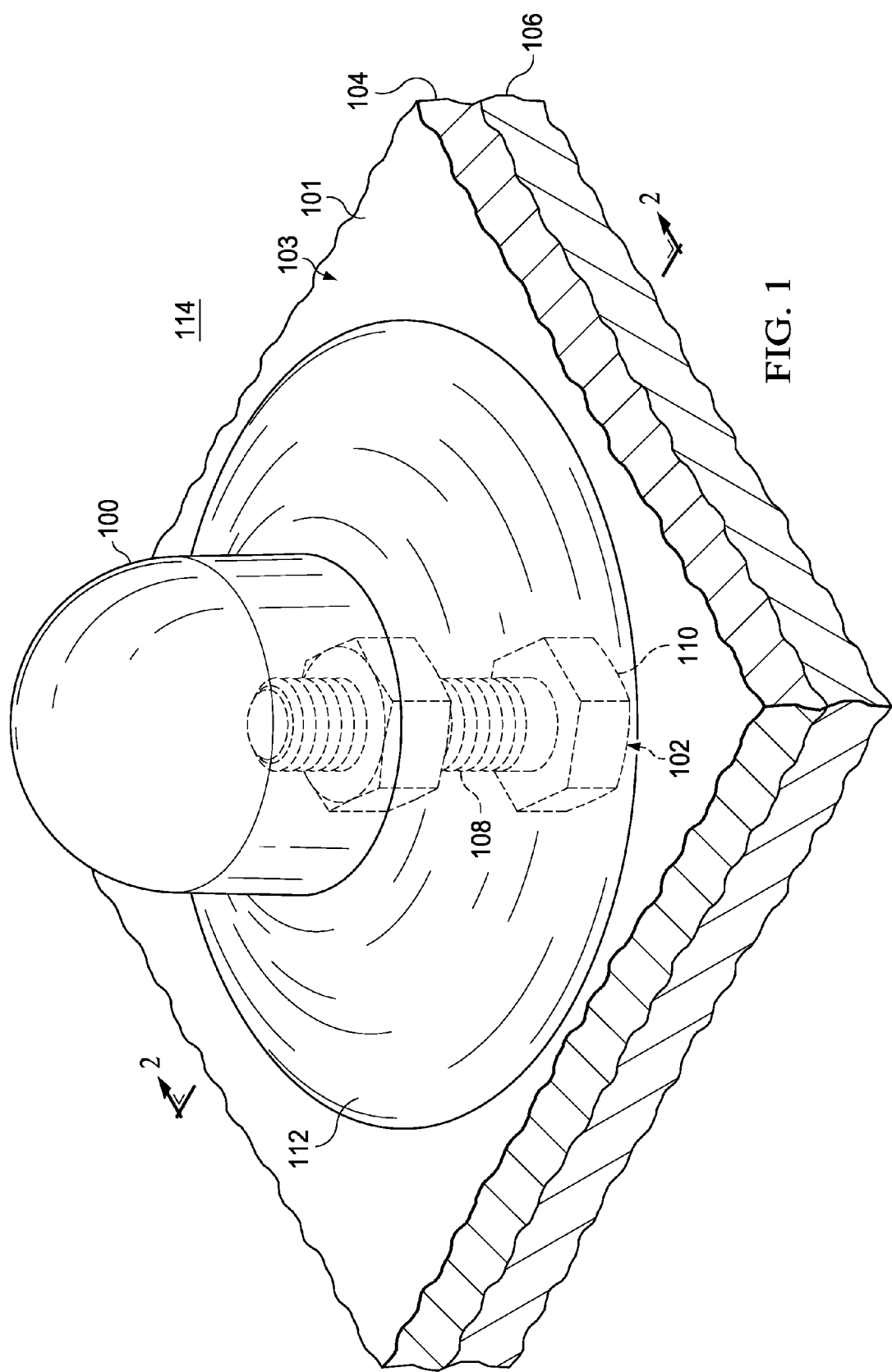
FIG. 1 is an illustration of an isometric view of a cover installed over a fastener system in accordance with an illustrative embodiment.

With reference now to FIG. 1, an illustration of an isometric view of a cover installed over a fastener system is depicted in accordance with an illustrative embodiment. As depicted, cover 100 has been installed over fastener system 102. In particular, cover 100 has been placed over fastener system 102 at surface 101 of object 103 in which fastener system 102 is installed.

As depicted, object 103 includes first structure 104 and second structure 106. Fastener system 102 is being used to join first structure 104 to second structure 106. Depending on the implementation, a fastener system, such as fastener system 102, may be used to join different types of structures. Each of the structures joined by the fastener system may take the form of, for example, without limitation, a skin panel, a rod, a beam, a spar, a rib, a tube, a plate, a structural assembly or some other type of structure.

In this illustrative example, fastener system 102 is comprised of number of components 108. As used herein, a "number of" items may be one or more items. In this manner, number of components 108 may be one or more components. In this example, number of components 108 includes bolt 110 as well as a nut (not shown in this view).

However, in other illustrative examples, fastener system 102 may be comprised of a number of components that include at least one of a fastener, a washer, a plate, a spacer, a gasket, a buckle, a locking device, and some other type of component. The fastener in the number of components may be selected from one of a screw, a nut, a bolt, a nail, a rod, a dowel, a pin, a clamp, a grommet, a latch, a peg, a clip, a rod, a zipper, an anchor, a tie, a tag, and other types of fasteners.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Sealant material 112 is used to attach cover 100 to surface 101 of object 103. In particular, sealant material 112 has adhesive properties that allow cover 100 to be fixedly installed over fastener system 102.

Sealant material 112 may be comprised of an elastomeric material in this depicted example. As a result, sealant material 112 may be referred to as an elastomeric sealant. In other illustrative examples, sealant material 112 may be comprised of a filler material in addition to the elastomeric material. In some cases, sealant material 112 may be comprised of one or more of an elastomeric material, a resin material, an acrylic material, an elastic material, a silicone material, a rubber material, and other types of materials.

In this illustrative example, sealant material 112 is applied over fastener system 102 prior to cover 100 being placed over fastener system 102. Cover 100 is then placed over sealant material 112. Of course, in other illustrative examples, sealant material 112 may be applied to an inside of cover 100 prior to cover 100 being placed over fastener system 102. In other words, cover 100 may be pre-filled with sealant material 112.

In this illustrative example, placement of cover 100 over sealant material 112 causes a portion of sealant material 112 to at least partially surround a flange (not shown in this view) of cover 100. In other words, when cover 100 is placed over sealant material 112, a portion of sealant material 112 squeezes out of and around the flange of cover 100. Of course, in other illustrative examples, sealant material 112 may not extend beyond the flange of cover 100.

Cover 100 may be comprised of a number of composite materials. In this illustrative example, cover 100 is comprised of a composite material in the form of a carbon fiber-reinforced plastic (CFRP) material. However, depending on the implementation, cover 100 may be comprised of a number of composite materials that include at least one of a carbon fiber-reinforced plastic material, a fiber-reinforced polymer, a glass-reinforced plastic, an aramid fiber-reinforced material, a metallic material, a fiberglass material, a plastic material, a thermoplastic material, a thermoset material, and some other type of composite material.

In this illustrative example, cover 100 is comprised of a number of composite materials selected to provide cover 100 with certain selected properties. For example, in certain situations, an electrical discharge may occur around fastener system 102. The electrical discharge may be, for example, without limitation, an electrical arc or a spark.

The electrical discharge may occur between the components that make up fastener system 102 or between fastener system 102 and the materials that make up object 103. Further, the electrical discharge may occur at or around fastener system 102 at any point along the entire length of fastener system 102. Cover 100 may be comprised of a number of composite materials selected such that cover 100 is configured to reduce an effect of the electrical discharge environment 114 outside cover 100.

For example, an electrical discharge around fastener system 102 may cause a number of materials to be released inside cover 100. These materials may include, for example, without limitation, a number of gases, a number of liquids, and/or a number of particulates. Further, these materials may be hot when released.

Cover 100 is configured to reduce an undesired release of these materials into environment 114 outside cover 100. In other words, cover 100 forms a barrier that substantially prevents these materials from escaping into environment 114.

In some cases, object 103 may be a fuel tank in an aerospace vehicle and surface 101 of object 103 may be an inner surface of the fuel tank. In this manner, environment 114 may be the inside chamber of the fuel tank. A release of hot materials inside the fuel tank may cause undesired effects within the fuel tank. Cover 100 is configured to reduce and/or prevent the undesired release of materials into the fuel tank to reduce a possibility of undesired effects occurring within the fuel tank in response to the electrical discharge occurring around the fastener system.

Additionally, cover 100 may be comprised of a number of composite materials selected such that cover 100 is configured to dissipate static charge. In particular, the number of composite materials may be selected such that at least one electrical property of cover 100 has a value within a range selected such that cover 100 is capable of dissipating static charge. In other words, cover 100 may be static dissipative. The at least one electrical property of the cover may include at least one of an electrical resistance of the cover, an electrical conductivity of the cover, and an electrical resistivity of the cover.

As used herein, the "electrical resistance" of an item is the opposition of the item to the flow of electric current through the item. The "electrical conductivity" of an item is the ability of the item to allow the flow of electric current through the item. The "electrical resistivity" an item is the ability of that item to prevent an electrical current from being conducted through the item.

In one illustrative example, cover 100 may be configured such that the electrical resistivity of cover 100 comprises a volume resistivity of about $1.0 \times 10^9$ ohm-meters ($\Omega$-m) or less when measured at about 40 volts (V) or less and/or a surface resistivity of about $1.0 \times 10^{11}$ ohm per square ($\Omega$/sq) or less when measured at about 100 volts (V) or less.

In some cases, the number of composite materials from which cover 100 is formed may be selected to reduce a level of corrosion that may occur at surface 101 of object 103. This corrosion may be caused by contact and/or near-contact between cover 100 and surface 101 of object 103.

Figure 2:
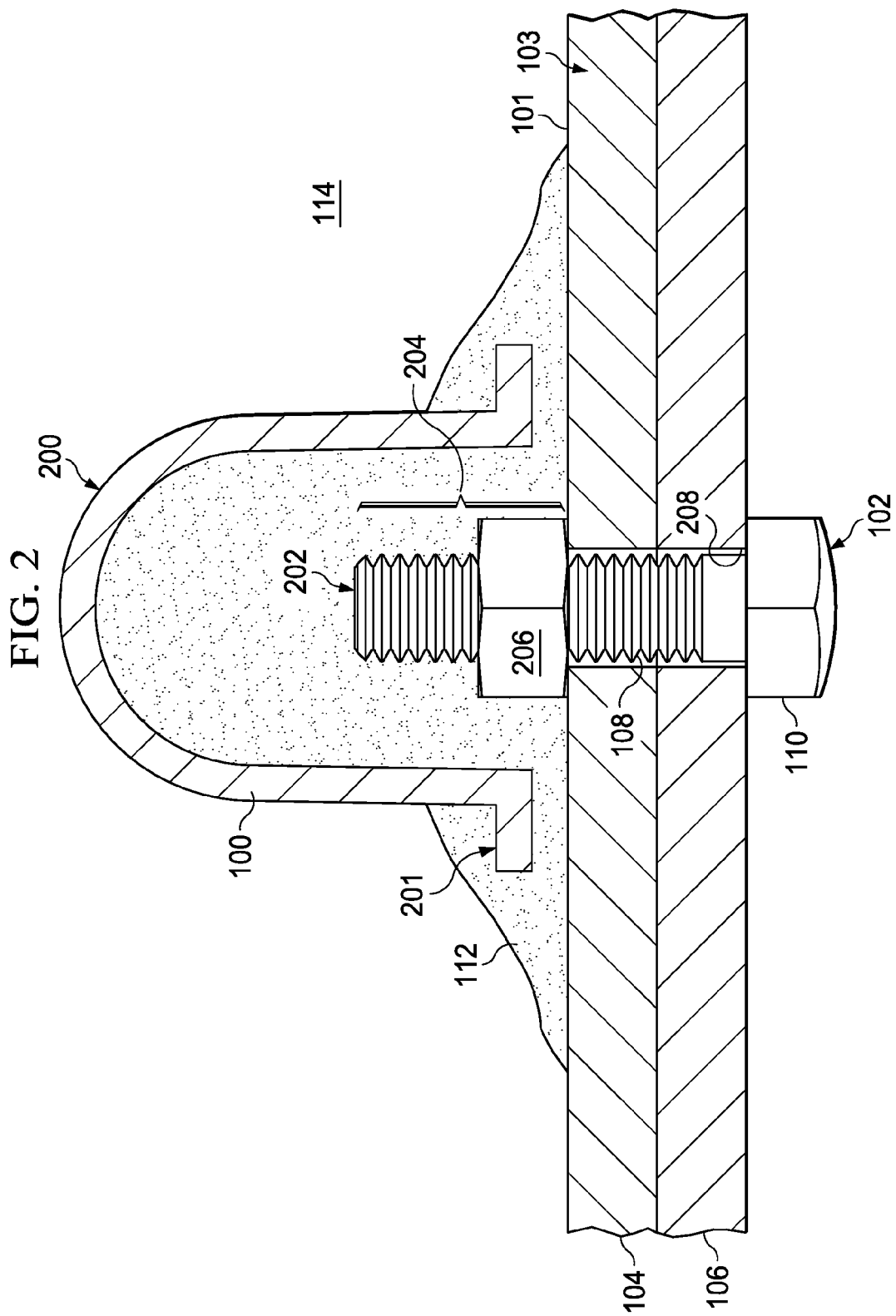
FIG. 2 is an illustration of a cross-sectional view of a cover installed over a fastener system in accordance with an illustrative embodiment.

With reference now to FIG. 2, an illustration of a cross-sectional view of a cover installed over a fastener system is depicted in accordance with an illustrative embodiment. In this illustrative example, a cross-sectional view of cover 100 installed over fastener system 102 in FIG. 1 is depicted taken along lines 2-2.

Cover 100 has shape 200. Shape 200 may be a bullet-type shape or conical shape having flange 201. Flange 201 of cover 100 is surrounded and covered by sealant material 112. Sealant material 112 attaches flange 201 to surface 101 of object 103.

Shape 200 is configured such that cover 100 may receive end 202 of fastener system 102 and cover substantially all of exposed portion 204 of fastener system 102. Exposed portion 204 of fastener system 102 includes nut 206. Exposed portion 204 of fastener system 102 is the portion of fastener system 102 that extends past surface 101 of object 103.

Fastener system 102 is located in hole 208 in object 103. As depicted, cover 100 may be configured to substantially prevent fluid flowing through hole 208 from flowing into environment 114 outside cover 100. Further, cover 100 may be configured to substantially prevent fluid in environment 114 outside cover 100 from flowing through hole 208. For example, when object 103 is a fuel tank and surface 101 is an inner surface of the fuel tank, cover 100 substantially prevents fuel stored within the fuel tank from leaking outside of the fuel tank through hole 208. Similarly, cover 100 substantially prevents fluid flowing through hole 208 from entering inside the fuel tank.

The illustrations of cover 100 and fastener system 102 in FIGS. 1-2 are not meant to imply physical or architectural limitations to the manner in which an illustrative embodiment may be implemented. Other components in addition to or in place of the ones illustrated may be used. Some components may be optional.

For example, in some cases, cover 100 may have a different shape than shape 200 in FIG. 2. In other illustrative examples, cover 100 may be used to cover the ends of two fastener systems with sealant material 112 applied over the ends of both fastener systems.

In still other illustrative examples, a coating may be applied to cover 100 to provide cover 100 with the capability to dissipate static charge. In some cases, the coating may be applied to at least a portion of cover 100 to reduce a level of corrosion at surface 101 of object 103 that may be caused by cover 100.

In some illustrative examples, sealant material 112 may be applied to first structure 104 without coming into contact with fastener system 102. For example, sealant material 112 may be applied in the shape of a ring around fastener system 102. However, sealant material 112 may be applied in a manner such that flange 201 of cover 100 may still contact sealant material 112 when cover 100 is placed over sealant material 112 and fastener system 102. In these examples, sealant material 112 may be used solely for attaching cover 100 to fastener system 102 and sealing an interface between cover 100 and fastener system 102.

In other illustrative examples, sealant material 112 may not be used to cover fastener system 102. Instead, an adhesive material and/or some other type of material may be used to install cover 100 over fastener system 102. Depending on the manner in which the adhesive material and/or other materials are applied, these materials may not come into contact with fastener system 102.

Figure 3:
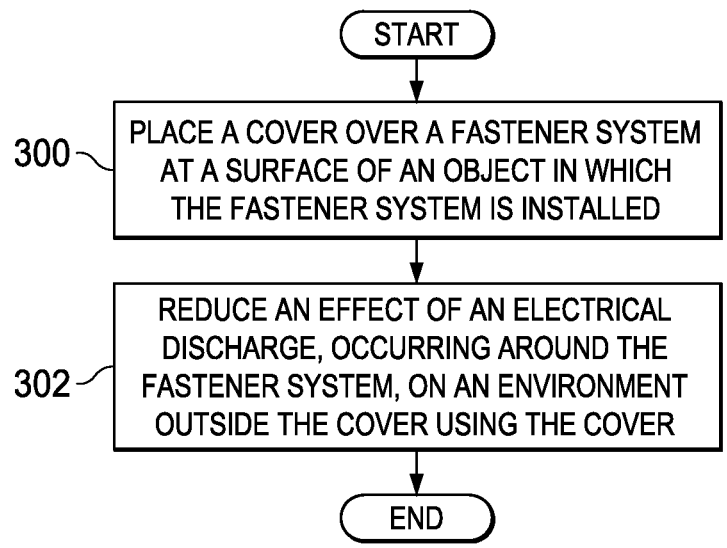
FIG. 3 is an illustration of a process for installing a cover on a fastener system in the form of a flowchart in accordance with an illustrative embodiment.

Turning now to FIG. 3, an illustration of a process for installing a cover over a fastener system is depicted in accordance with an illustrative embodiment. The process illustrated in FIG. 3 may be used to install a cover, such as, for example, without limitation, cover 100 from FIG. 1, over a fastener system, such as, for example, without limitation, fastener system 102 from FIG. 1.

The process begins by placing a cover over a fastener system at a surface of an object in which the fastener system is installed (operation 300). The cover is comprised of a number of composite materials. In these illustrative examples, a sealant material may be either applied over the fastener system or applied inside the cover prior to the cover being placed over the fastener system. Placement of the cover over the fastener system may cause a portion of the sealant material to squeeze outside of a flange of the cover.

Thereafter, an effect of an electrical discharge, occurring around the fastener system, on an environment outside the cover is reduced using the cover (operation 302), with the process terminating thereafter. In particular, in operation 302, the cover may reduce an undesired release of a number of materials into the environment outside the cover in response to the electrical discharge occurring around the fastener system.

Figure 4:
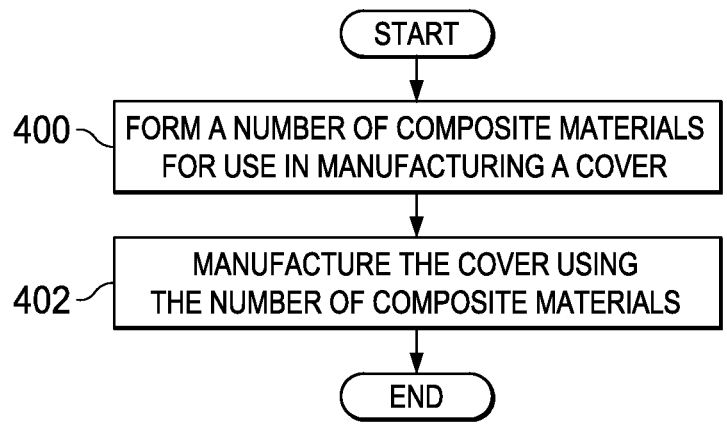
FIG. 4 is an illustration of a process for manufacturing a cover for a fastener system in the form of a flowchart in accordance with an illustrative embodiment.

With reference now to FIG. 4, an illustration of a process for manufacturing a cover for a fastener system is depicted in accordance with an illustrative embodiment. The process illustrated in FIG. 4 may be used to manufacture a cover, such as, for example, without limitation, cover 100 from FIG. 1.

The process begins by forming a number of composite materials for use in manufacturing the cover (operation 400). In operation 400, the number of composite materials may be formed according to specifications selected such that the at least one electrical property of the cover will have a value within a selected range.

In particular, the number of composite materials may be formed according to specifications selected such that at least one of the electrical resistance of the cover, the electrical conductivity of the cover, and the electrical resistivity of the cover has a value within a selected range. The range may be selected such that the cover will be static dissipative. In this illustrative example, the number of composite materials may include a carbon fiber-reinforced plastic material.

Thereafter, the process manufactures the cover using the number of composite materials (operation 402), with the process terminating thereafter. In operation 402, the cover is manufactured such that the cover has a shape configured to receive the end of the fastener system and any components of the fastener system that extend past a surface of the object in which the fastener system is installed.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 500 as shown in FIG. 5 and aircraft 600 as shown in FIG. 6. Turning first to FIG. 5, an illustration of an aircraft manufacturing and service method in the form of a block diagram is depicted in accordance with an illustrative embodiment. During pre-production, aircraft manufacturing and service method 500 may include specification and design 502 of aircraft 600 in FIG. 6 and material procurement 504.

During production, component and subassembly manufacturing 506 and system integration 508 of aircraft 600 in FIG. 6 takes place. Thereafter, aircraft 600 in FIG. 6 may go through certification and delivery 510 in order to be placed in service 512. While in service 512 by a customer, aircraft 600 in FIG. 6 is scheduled for routine maintenance and service 514, which may include modification, reconfiguration, refurbishment, and other maintenance or service.

Each of the processes of aircraft manufacturing and service method 500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 6, an illustration of an aircraft in the form of a block diagram is depicted in which an illustrative embodiment may be implemented. In this example, aircraft 600 is produced by aircraft manufacturing and service method 500 in FIG. 5 and may include airframe 602 with plurality of systems 604 and interior 606. Examples of systems 604 include one or more of propulsion system 608, electrical system 610, hydraulic system 612, and environmental system 614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 500 in FIG. 5. For example, one or more covers, implemented in a manner similar to cover 100 described in FIG. 1, along with a sealant material, such as sealant material 112 in FIG. 1, may be used to cover a corresponding one or more fastener systems for aircraft 600 during component and subassembly manufacturing 506, system integration 508, certification and delivery 510, and/or routine maintenance and service 514.

Using these types of covers may provide the desired level of suppression of the potential for sparking in aircraft 600. Further, using these types of covers may reduce the amount of time needed for sealing and covering fastener systems for aircraft 600 as compared to the currently available caps pre-molded from elastomeric sealants.

In one illustrative example, components or subassemblies produced in component and subassembly manufacturing 506 in FIG. 5 may be fabricated or manufactured in a manner similar to components or subassemblies produced while aircraft 600 is in service 512 in FIG. 5. As yet another example, one or more apparatus embodiments, method embodiments, or a combination thereof may be utilized during production stages, such as component and subassembly manufacturing 506 and system integration 508 in FIG. 5. One or more apparatus embodiments, method embodiments, or a combination thereof may be utilized while aircraft 600 is in service 512 and/or during maintenance and service 514 in FIG. 5. The use of a number of the different illustrative embodiments may substantially expedite the assembly of and/or reduce the cost of aircraft 600.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising :
    a cover comprising a unitary piece comprising a composite material, and having a shape comprising:
        a cylinder portion with a dome covering a first end of the cylinder and an opening at the opposite end, and a flange extending radially from the cylinder's edge and having a surface distal to the dome which is substantially perpendicular with the cylinder,
        a sealant filling and adhering to the interior of the cover and adhering to and enveloping the flange, and for adhering to an exposed portion of a fastener system;
        the apparatus configured such that in operation, the cover forms a barrier that prevents materials released inside of the cover from entering an environment outside of the cover.

2. The apparatus of claim 1, wherein the materials released inside the cover comprise at least one of: a number of gases, a number of liquids, and a number of particulates.

3. The apparatus of claim 1, wherein the composite material comprises:
    an electrical resistivity that prevents an electrical discharge from the fastener system from being conducted through the cover; and
    at least one of: a carbon fiber-reinforced plastic material, a fiber-reinforced polymer, a glass-reinforced plastic, an aramid fiber reinforced material, a metallic material, a fiberglass material, a plastic material, a thermoplastic material, and a thermoset material; and the sealant contacts and envelops all of a portion of the fastener system that extends past a surface of an object.

4. The apparatus of claim 1, wherein the cover is further configured to dissipate static charge.

5. The apparatus of claim 4, wherein the composite material is selected such that at least one electrical property of the cover is configured to dissipate the static charge.

6. The apparatus of claim 5, wherein the at least one electrical property of the cover includes at least one of an electrical resistance of the cover, an electrical conductivity of the cover, and the electrical resistivity of the cover.

7. The apparatus of claim 1, wherein the fastener system is located in a hole in an object and wherein the cover is configured to substantially prevent at least one of fluid flowing through the hole from flowing into the environment outside the cover and fluid in the environment outside the cover from flowing through the hole.

8. The apparatus of claim 1 further comprising:
the sealant being between a portion of the fastener system that extends past a surface of an object and the cover such that the cover does not contact the portion, and attaching the cover to the portion and to the surface of the object.

9. The apparatus of claim 8, further comprising the sealant being over the fastener system at the surface of the object prior to the cover being placed over the fastener system.

10. The apparatus of claim 8, further comprising the sealant being inside the cover prior to the cover being placed over the fastener system.

11. The apparatus of claim 8, further comprising:
the flange attached to the surface of the object by the sealant.

12. The apparatus of claim 1, wherein the fastener system comprises:
a number of components including at least one of a fastener, a washer, a plate, a spacer, a gasket, a buckle, and a locking device, wherein the fastener is selected from one of a screw, a nut, a bolt, a nail, a rod, a dowel, a pin, a clamp, a grommet, a latch, a peg, a clip, a rod, a zipper, an anchor, a tie, and a tag.

13. The apparatus of claim 1 further comprising:
a coating applied to at least a portion of the cover, such that the coating dissipates static charge and reduces a level of corrosion at a surface of an object near the cover.

14. The apparatus of claim 1, further comprising the fastener system being in a fuel tank in an aerospace vehicle such that the cover is configured to reduce a possibility of undesired effects occurring within the fuel tank in response the materials released inside the cover stem from to an electrical discharge occurring around the fastener system.

15. The apparatus of claim 1, further comprising the cover comprising the electrical resistivity comprising a volume resistivity of about $1.0 \times 10^9$ ohm-meters ($\Omega$-m) or less when measured at about 40 volts (V).

16. The apparatus of claim 1, further comprising the cover comprising the electrical resistivity comprising a surface resistivity of about $1.0 \times 10^{11}$ ohm per square ($\Omega$/sq) or less when measured at about 100 volts (V) or less.

17. An apparatus comprising:
a cover comprising a unitary piece comprising a composite material and having;
a volume resistivity of about $1.0 \times 10^{(9)}$ ohm-meters or less when measured at 40 volts; and
a surface resistivity of about $1.0 \times 10^{(11)}$ ohms per square or less when measured at 100 volts or less;
and having a shape comprising a cylinder portion with a dome covering a first end of the cylinder and an opening at the opposite end, and a flange extending radially from the cylinder's edge and having a surface distal to the dome which is substantially perpendicular with the cylinder;
a coating applied to the cover such that the coating dissipates static charge and reduces a level of corrosion;
a sealant filling and adhering to the interior of the cover and adhering to and enveloping the flange, and for adhering to an exposed portion of a fastener system;
the apparatus configured such that in operation, the cover forms a barrier that prevents materials released inside of the cover from entering the environment outside of the cover, and such that the electrical resistivity prevents an electrical discharge from being conducted through the cover.

* * * * *